United States Patent [19]

Kearsley

[11] Patent Number: 4,696,011
[45] Date of Patent: Sep. 22, 1987

[54] LASER DEVICE EMPLOYING A POROUS MATERIAL IN THE DISCHARGE CHAMBER

[75] Inventor: Andrew J. Kearsley, Oxford, England

[73] Assignee: Oxford Lasers Limited, Oxford, England

[21] Appl. No.: 788,976

[22] Filed: Oct. 18, 1985

[30] Foreign Application Priority Data

Oct. 18, 1984 [GB] United Kingdom ............... 8426319

[51] Int. Cl.$^4$ .............................................. H01S 3/03
[52] U.S. Cl. ..................................................... 372/61
[58] Field of Search ............................ 372/61, 58, 55

[56] References Cited

U.S. PATENT DOCUMENTS 4,475,202 10/1984 Baron et al. ........................ 372/61

Primary Examiner—Gene Wan
Attorney, Agent, or Firm—Spencer & Frank

[57] ABSTRACT

A lasing device which uses as a lasing media a material which lases in the gas or vapor phase, and in which the discharge chamber includes a porous element which absorbs the lasing material when it condenses into the liquid or solid phase. The porous element, which can be a porous ceramic material, retains the liquid media and does not allow it to run along the discharge tube if this tube is moved or tilted. The laser is thus able to operate when being moved or tilted.

16 Claims, 7 Drawing Figures

LASER DEVICE EMPLOYING A POROUS MATERIAL IN THE DISCHARGE CHAMBER

DESCRIPTION

BACKGROUND OF THE INVENTION

This invention relates to laser devices and particularly, although not exclusively, to those which use as lasing media materials which are normally solid or liquid at room temperature and which lase in the gas or vapour phase.

Such a lasing material can be a metal which is heated to the vapour phase in the discharge chamber but which can form pools of molten metal on the bottom of the discharge chamber. If it is required in operation to move the laser device or to operate the device with the discharge chamber tilted, the molten metal will be dislodged and will migrate about or collect at one end of the discharge chamber. Some laser devices which use metal vapours are provided with wicks, usually made of metal mesh, to encourage molten metal to wick back to the discharge area. Such wicks can have a large cross-section and will cause significant obstruction of the laser beam. Also, in certain circumstances, the liquid will not "wet" the wick material and, in any case, when tilted, molten metal can run out of a wick.

The present invention provides a design which is capable of lasing using a metal in the vapour phase and in which lasing can be satisfactorily carried out whilst the laser device is tilted or, indeed, whilst it is moved about.

SUMMARY OF THE INVENTION

According to the invention there is provided a laser device comprising a discharge chamber, means for producing in said chamber the appropriate conditions for stimulated emission, wherein said discharge chamber is formed at least in part from a porous material.

BRIEF DESCRIPTION OF THE DRAWINGS

Embodiments of the invention will now be described, by way of example only, with reference to the accompanying drawings, in which.

DESCRIPTION OF THE PREFERRED EMBODIMENTS

Figure 1:
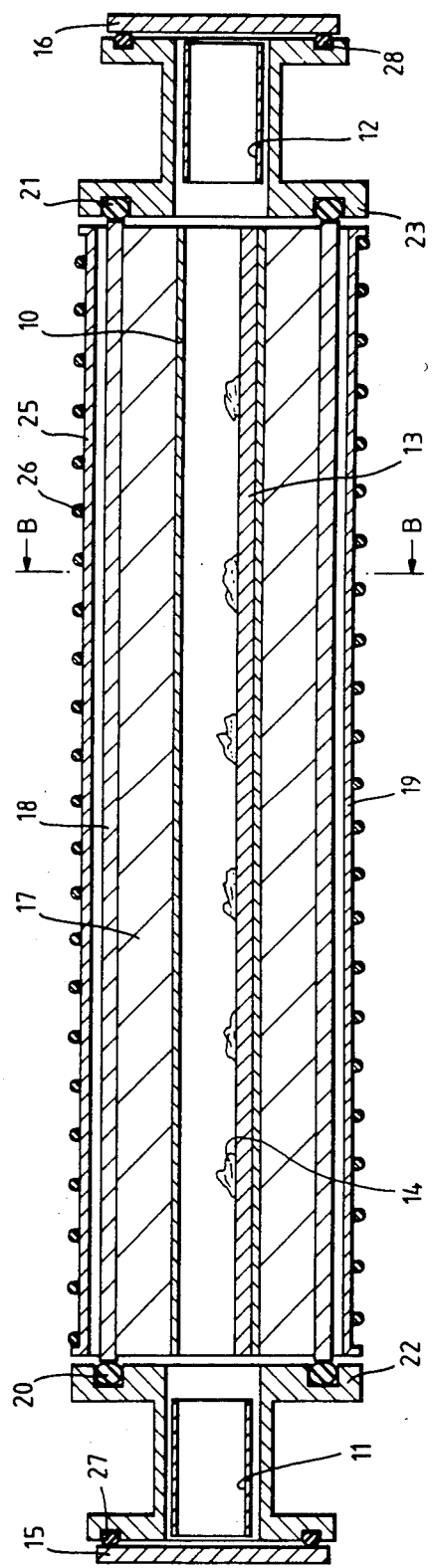
FIG. 1 is a longitudinal section through a laser device constructed in accordance with the invention.

Referring now to FIG. 1, the laser device has a discharge chamber formed by a non-porous ceramic tube 10. Discharge is generated in the tube 10 between an electrode 11 at one end of the tube and a second electrode 12 at the other end. The electrodes 11, 12 are connected to a power supply system which is not illustrated. The power system generates a pulsed discharge in the tube at a repetition rate of 5 kHz. When the device is constructed a layer of porous ceramic paste 13 is spread along the bottom of the tube 10 as shown and discrete lumps or wire bundles of copper are placed, as at 14, on top of the paste 13. Upon start-up of the device the discharge gradually heats up the tube 10, the paste 13 dries out and hardens and the pieces of copper melt and are then partially vapourised and the metal can then be made to lase.

The lasing output travels longitudinally along the tube and is reflected between a mirror 15 at one end, which is a high reflectivity mirror and which reflects the majority of the emission, and a window 16 at the other end, which is a low reflectivity mirror and which only reflects part of the emission, the remainder passing through this window to form the output of the laser device.

The discharge tube 10 is surrounded by cylindrical thermal insulation 17 and is enclosed in a vacuum jacket 18. This in turn is surrounded by a cylindrical cooling jacket 19. The jacket 18 seats against "O" rings 20 and 21, located in annular recesses in end plate members 22, 23. These end plate members are secured as by screws (not shown) so as to compress "O" rings 20, 21 against the vacuum jacket 18. The cooling jacket 19, mounted around the vacuum jacket 18, consists of a flanged cylinder 25 having tubular coils 26 wound helically around its outside. The coils 26 are brazed to the jacket so as to make good thermal contact therewith and the coils carry a cooling medium such as water.

The mirror 15 and window 16 are sealed to end plate members 22, 23 by "O" rings 27, 28 respectively so as to complete the vacuum chamber.

When the laser device is operating that portion of the metal which is not vapourised is still molten. As the layer of material 13 is porous, the liquid metal is absorbed into it and can then evaporate off as a vapour into the discharge area under the effect of heat from the discharge.

When the laser device is operated tilted or needs to be moved around when in operation, the metal which is molten is retained in material 13 and does not run longitudinally along the discharge chamber.

When the power supply to the laser device is switched off and the device cools, the metal will solidify in the porous ceramic material 13 and when the discharge is restarted the metal will melt and revapourise.

Figure 2:
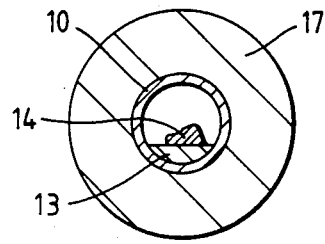
FIG. 2 is a cross-section at B—B through part of the laser device of FIG. 1.

FIG. 2 shows insulation 17, non-porous tube 10 and layer 13 in cross-section, and it can clearly be seen that layer 13 extends all along the lower part of tube 10.

In the above arrangement, when the laser is run up in the normal way the copper first melts and some then evaporates off. When the copper condenses as a liquid either during normal operation or when the discharge is turned off, the copper migrates back into the porous ceramic matrix.

Figure 3:
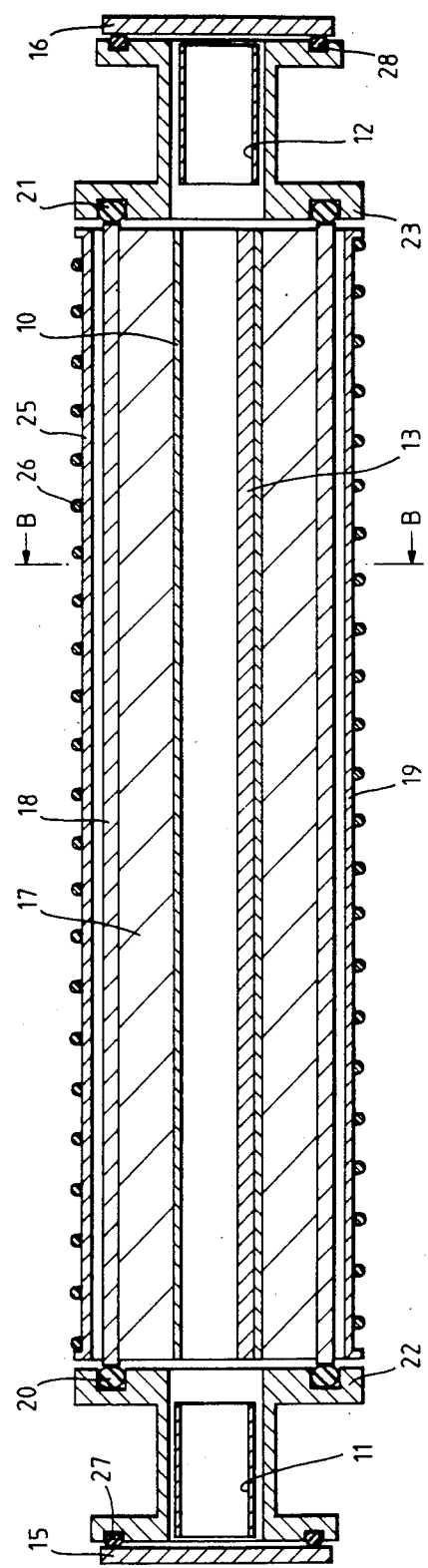
FIG. 3 is a longitudinal section similar to FIG. 1 showing an alternative arrangement.

In the arrangement described in relation to FIGS. 1 and 2, the copper is placed in discrete pieces on top of the layer of paste. In the arrangement shown in FIG. 3 the copper is in the form of granules which are mixed with and uniformly distributed through the ceramic paste 13.

These granules form small holes in the ceramic paste and tend to enhance the porous nature of the ceramic material thus increasing its capability to retain the copper when it is molten.

Figure 4:
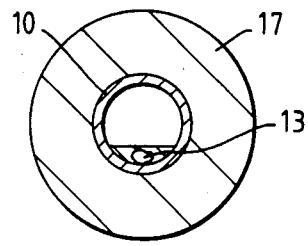
FIG. 4 is a section similar to FIG. 2 but showing a further alternative, and, FIGS. 5, 6 and 7 are similar cross-sections to FIG. 2 but showing different constructions.

In a further alternative shown in FIG. 4, the copper is provided in the form of discrete pieces in the paste upon original insertion. When the paste sets the copper forms pockets in the ceramic porous layer which act as separate reservoirs for the copper when it is molten. The molten copper is thus able to flow easily into these pockets if the laser device is moved or tilted, as well as being able to permeate the porous ceramic material.

It has been found in operation that the porous ceramic matrix containing molten or solid copper does not form a continuous low resistance path along the length of the laser device despite the presence of copper in an apparently continuous form and it does not short out the discharge.

Figure 5:
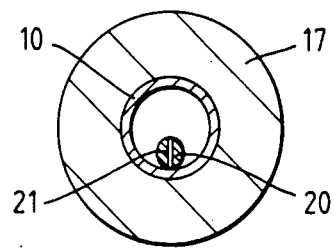

In the alternative shown in FIG. 5, the porosity is provided by a separate rod 20, made of non-porous ceramic material, but having a multiplicity of holes 21 extending through it.

In the illustrated arrangement the holes 21 all extend diametrically through the rod 20 and are aligned in a single line uniformly spaced along the length of the rod. However, these holes could have any orientation and number provided they give the required porosity for retaining the lasing material.

The advantage of the arrangement shown in FIG. 5 is that ceramic paste is not required in the discharge chamber. This can be an advantage in certain applications in which it has been found in operation that the paste tends to break down and the powder thus released tends to coat and obscure the surfaces of the mirrors of the lasing device thus requiring the lasing device to be shut down for cleaning.

Figure 6:
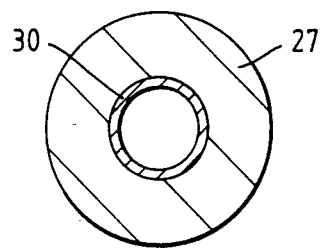

Referring now to FIG. 6, a further alternative arrangement is shown in which tubular insulation 27 is lined with a complete interior tubular coating 30 comprising granulated copper and powdered alumina mixed in a paste. In operation the copper will melt and some will vapourise and the alumina will set hard. The molten copper will migrate into the alumina matrix of the tube coating 30.

With this arrangement, which does not use non-porous material, the discharge chamber has a low heat capacity giving rapid warm-up and the construction is relatively cheap because high density alumina tubing, in a porous or non-porous form, is not used.

Figure 7:
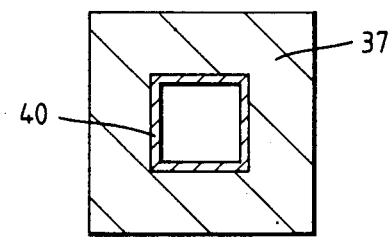

Referring now to FIG. 7, the discharge chamber comprises insulation 37 having a square cross-section and a porous lining 40 of copper granules/alumina cement paste. The tube 37 is formed of porous insulating material and can conveniently be given a cross-section of the shape required, e.g. rectangular or H-shaped, as an alternative to the square cross-section shown. In an adaptation of the arrangement of FIG. 7, the chamber can be lined with a relatively non-porous layer made of pure alumina paste which is first dried. A second layer of alumina paste mixed with copper powder may be applied to form a more porous matrix for holding the copper. The first paste layer forms a relatively impervious layer preventing the copper flowing into the alumina fibre and the second paste layer provides the required porosity.

I claim:

1. A laser device comprising a hollow elongated element, the interior of said element forming a discharge chamber;

a lasing medium contained within said chamber;

means for producing within said chamber conditions for stimulated emission of said medium; and a porous material extending along at least a major portion of the length of the interior of said hollow elongated element, a portion of said lasing medium being vaporized when said conditions for stimulated emission exist within said chamber and the remainder thereof being molten, the molten portion of said lasing medium being absorbed into said porous material and retained therein without allowing conduction therethrough along the length of said chamber.

2. A laser device as claimed in claim 1 wherein said hollow elongated element comprises a non-porous tube and said porous material is in the form of a paste.

3. A laser device as claimed in claim 2, wherein said discharge chamber has a non-circular cross-section (37).

4. A laser device as claimed in claim 1 wherein said lasing medium is mixed with said porous material, said medium being in the form of lumps which form hollows in said porous material after operation of said device.

5. A laser device as claimed in claim 4, wherein said discharge chamber has a non-circular cross-section (37).

6. A laser device as claimed in claim 1 wherein said lasing medium is mixed with said porous material, said medium being in the form of granules distributed through said porous material.

7. A laser device a claimed in claim 6, wherein said discharge chamber has a non-circular cross-section (37).

8. A laser device as claimed in claim 1 wherein said hollow elongated element comprises a non-porous tube and said porous material comprises a non-porous member having a multiplicity of holes therethrough of a size suitable for retaining said lasing medium in the molten or solid state.

9. A laser device as claimed in claim 8, wherein said discharge chamber has a non-circular cross-section (37).

10. A laser device as claimed in claim 1 wherein said hollow elongated member is a tubular insulator.

11. A laser device as claimed in claim 10, wherein said discharge chamber has a non-circular cross-section (37).

12. A laser device as claimed in claim 1 wherein said discharge chamber has a non-circular cross-section.

13. A laser device as claimed in claim 2 wherein said lasing medium is mixed with said porous material, said medium being in the form of lumps which form hollows in said porous material after operation of said device.

14. A laser device as claimed in claim 13, wherein said discharge chamber has a non-circular cross-section (37).

15. A laser device as claimed in claim 2 wherein said lasing medium is mixed with said porous material, said medium being in the form of granules distributed through said porous material.

16. A laser device as claimed in claim 15, wherein said discharge chamber has a non-circular cross-section (37).

* * * * *